Oct. 15, 1929.  J. R. WATSON  1,731,644
EXCITER CHANGERS FOR SYNCHRONOUS ELECTRICAL MACHINES
Filed Aug. 15, 1925
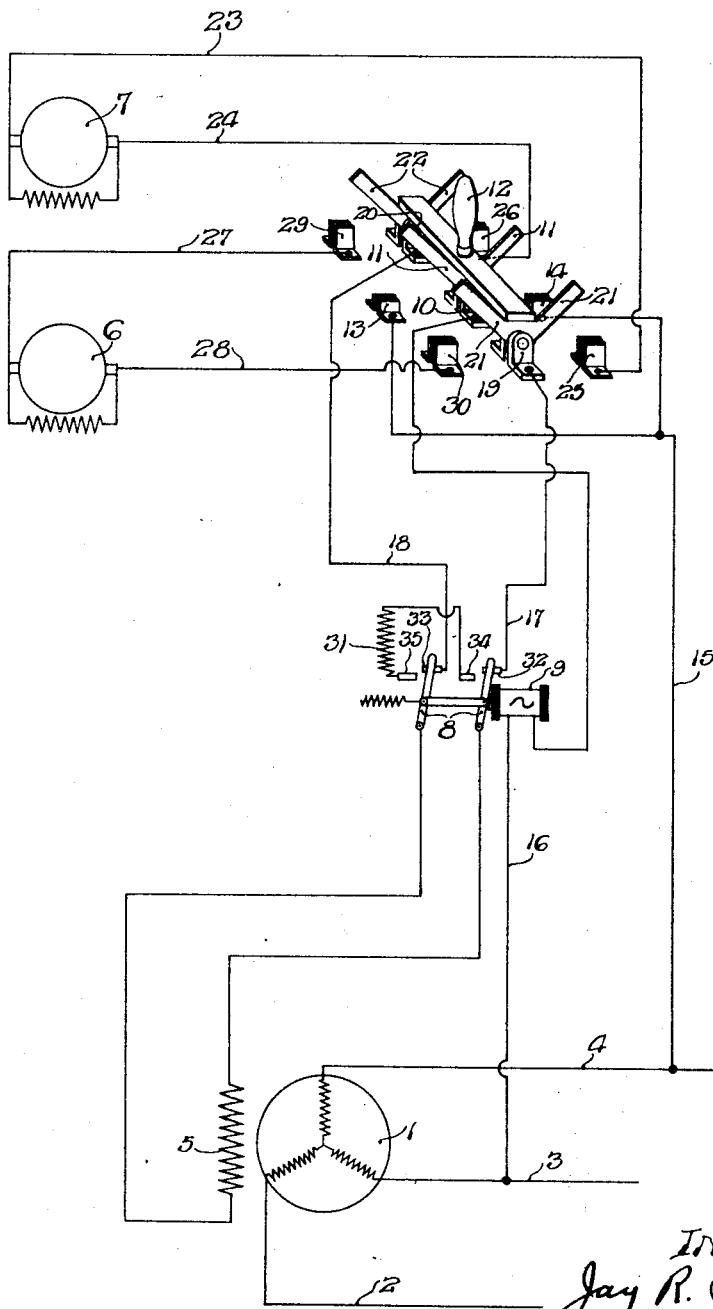
INVENTOR
Jay R. Watson
Nissen & Crane
BY  ATTYS.

Patented Oct. 15, 1929

1,731,644

UNITED STATES PATENT OFFICE

JAY R. WATSON, OF CHICAGO, ILLINOIS, ASSIGNOR TO THE IDEAL ELECTRIC & MANUFACTURING COMPANY, OF MANSFIELD, OHIO, A CORPORATION OF OHIO

EXCITER CHANGERS FOR SYNCHRONOUS ELECTRICAL MACHINES

Application filed August 15, 1925. Serial No. 50,343.

This invention relates to means for changing the connection with the field of a synchronous motor or generator from one source of excitation to another without interrupting the operation of the synchronous machine and without the necessity of paralleling the exciters preparatory to making the change in the connection.

One of the objects of the invention is to provide means for changing exciters including a transfer switch which effects the change from one exciter to the other, combined with an arrangement whereby no current is broken by the transfer switch when the field is changed from one exciter to the other.

A further object of the invention is to provide an arrangement wherein the field discharge from the synchronous machine is taken care of automatically and properly through a field discharge resistance which is connected to an automatic field switch, the field switch being automatically opened at the time the exciter transfer switch is operated.

A further object of the invention is to provide an arrangement in which the change from one exciter to the other can be made while both exciters are running and without the necessity of shutting down the synchronous motor.

A further object of the invention is to provide an arrangement in which the change of exciters may be accomplished by simply throwing an exciter transfer switch from one position to the other, thus obviating the necessity of special skill to effect the change.

A further object of the invention is to provide an arrangement in which it is not necessary to parallel the exciters preparatory to changing from one to the other. This makes it unnecessary to accurately adjust the voltages of the exciters prior to the change and avoids the necessity of providing a volt meter for the exciters, a lamp across the terminals being all that is required to indicate approximately the exciter voltage.

A further object of the invention is to provide an arrangement wherein the exciter transfer switch is never opened under load conditions, thus avoiding arcing or flashing.

A further object of the invention is to provide an arrangement wherein the field circuit is broken on the automatic field switch where the field discharge resistance is connected which automatically takes care of the discharge from the field of the synchronous machine. This prevents excessive voltage from building up at the time of breaking the field current, such as would occur if the field excitation were transferred from one source to the other without the use of a field discharge resistance. This arrangement does away with the necessity of paralleling the exciters and thereby saves the expense of an exciter panel with its two D. C. ammeters and one D. C. volt meter. Elimination of the exciter panel saves space required for a switchboard. Due to the automatic feature of the invention the elimination of the necessity of paralleling the exciters and also the ability to transfer from one exciter to the other with both exciters running and the synchronous machine operating, the transfer from one source of excitation to the other may be made in a very short time, which is of great importance, especially in emergencies.

A further object of the invention is to avoid the danger of obtaining a reversal of polarity of either exciter which is present when the two exciters are paralleled prior to making the change.

Further objects of the invention will appear from the description and drawing.

The invention is exemplified in the combination and arrangement of parts shown in the accompanying drawing and described in the following specification, and it is more particularly pointed out in the appended claims.

In the drawing, the figure is a diagrammatic representation of the circuit and instruments as connected according to the present invention, the exciter transfer switch being shown in diagrammatic perspective.

In the drawing, the numeral 1 indicates a synchronous motor connected with the supply lines 2, 3 and 4 of a three-phase alternating current circuit. 5 designates the field winding for the synchronous motor which is supplied with direct current from one or the other of the exciters 6 and 7. It will be understood that the arrangement could be applied as well to a synchronous generator as to a motor. The exciter generators 6 and 7 are preferably shunt wound, as indicated in the diagram. The current for the field winding 5 is controlled through a double switch 8 operated by a relay 9 having one terminal thereof connected with the central terminal 10 of the central blade 11 of a transfer switch 12. The relay circuit may be connected by means of the blade 11 with either of the switch contacts 13 or 14 which are in turn connected through the conductor 15 to the supply line 4. The other terminal of the relay 9 is connected through the conductor 16 to the supply line 3. By this arrangement when the switch 12 is moved to its extreme position in either direction, current will be supplied to the relay 9 and the double switch 8 will be drawn into the position shown in the diagram. When the switch 12 is moved to a neutral position, as shown in the figure, the relay 9 will be de-energized and the switch 8 will automatically move to the opposite position from that shown in the drawing.

In the position shown in the drawing, the switch 8 connects the field 5 through the wires 17 and 18 to the central binding posts 19 and 20, respectively, of the end blades 21 and 22 of the transfer switch 12. The exciter 7 is connected by leads 23 and 24 to the contacts 25 and 26, respectively, at one side of the transfer switch 12. When the switch 12 is thrown to the right, as viewed in the figure, the exciter 7 will be connected through the switch blades 21 and 22, the leads 17 and 18, and the switch 8 with the field 5. When the switch 12 is thrown to its reverse position the exciter 6 is connected to the field circuit through the leads 27 and 28, the contacts 29 and 30, the switch blades 21 and 22, and the leads 17 and 18. It will be apparent that if the switch 12 were thrown from one position to the other while connected with the field of the synchronous machine there would be destructive arcing at the switch due to the discharge from the field windings of the synchronous machine when the circuit is broken and there would also be danger of puncturing the synchronous machine field windings due to the induced electromotive force in the field circuit of the synchronous machine at the time that the circuit is broken. In order to avoid these dangers a by-pass shunt 31 is provided for the induced current from the field of the synchronous machine and during the change from one exciter to the other the connection of the synchronous machine field is shifted from the exciter source to the by-pass shunt 31. This is accomplished by the central blade 11 of the transfer switch. The contacts 13 and 14 of this switch are made shorter than the contacts 25, 26, 29 and 30.

If the switch is at either of its extreme positions with the blades at one side of the switch in engagement with their respective contacts and is rocked upon its pivot to shift from one position to the other, the blade 11 will break connection with its contact while the blades 21 and 22 are still connected. This will break the circuit through the relay 9 and permit the switch 8 to shift from contacts 32 and 33 to contacts 34 and 35, respectively. This will shift the connection of the field circuit 5 from the exciter to the by-pass 31. The contacts 32, 33, 34 and 35 are preferably arranged so that the break with the contacts 32 and 33 occurs as nearly simultaneously with the engagement of the contacts 34 and 35 as possible. However, if the connection with the contacts 34 and 35 occurs slightly before the break with the contacts 32 and 33 no damage will be done as the addition of the resistance 31 in parallel with the field windings 5 will be only instantaneous and the overload on the exciter will not be sufficient to produce any appreciable result. The resistance of the by-pass 31 in practice is usually from one and one-half to two and one-half times the resistance of the motor field, although this proportion may be varied within limits.

The switch 8 is usually provided with a magnetic blow-out for preventing arcing from the terminals 32 and 33 when the connection with the exciter generator is broken. It will be seen that the field of the synchronous machine is not broken until connection is made with the by-pass resistance 31 so that no damage occurs from induced current when the field circuit is broken. The connection with the exciter generator is not broken at the transfer switch until the circuit has been broken by the magnetically operated field switch. There will therefore be no arcing when the transfer switch is opened. Since the circuit in the relay 9 is not re-established until after the transfer switch blades 21 and 22 have engaged the contacts of the other exciter generator, the making and breaking of contact of the switch blades 21 and 22 occurs while the excitation circuit is broken. The exciters are never parallel so that exact regulation of the voltage is not required. There is no danger of reversing the polarity of the exciters since they are never connected to each other. It is impossible to break the circuit of the exciter at the transfer switch while the exciter is connected with the field of the synchronous machine for operation of the switch automatically de-energizes the relay 9 before the exciter circuit is opened. This in turn automatically connects the by-pass resistance 31 to the field of the synchronous machine and thereafter opens the circuit of the exciter at the automatic field switch.

The process of changing from one exciter to the other by the use of the present invention is very simply and quickly done. It is only necessary to throw the switch 12 from one side to the other. This may be done when both the exciters are running and when the synchronous machine is also running. The period during which the current is shut off from the field winding is of short duration so that the operation of the synchronous motor is not perceptibly affected and the speed is not sufficiently changed to pull the motor out of step.

I claim:

1. The combination with a synchronous machine having a field winding, of interchangeable exciters for energizing said winding, a switch constrained to open and close for changing the connection of said field winding from one of said exciters to the other, means for automatically breaking the circuit of said field winding prior to the opening of said circuit by said switch when said switch is operated and a by-pass for connection in shunt across said field winding by said means.

2. The combination with a synchronous machine having a field winding, of a pair of exciters for energizing said winding, a transfer switch constrained to open and close for changing the connection of said winding from one to the other of said exciters, a field switch for breaking the connection between said field and said transfer switch, a by-pass for said field winding, and means for automatically opening said field switch and connecting said by-pass in shunt across said field winding when said transfer switch is operated.

3. In combination, a synchronous electrical machine having a field winding, a pair of exciters for said winding, a transfer switch constrained to open and close for selectively connecting said exciters with said winding, a field switch for breaking the circuit between said exciters and said winding, a relay for controlling said field switch, a by-pass for said field circuit, and means connected with said transfer switch for controlling the circuit of said relay to cause said field switch to open and to connect said by-pass in shunt with said field circuit during the operation of said transfer switch.

4. The combination with a synchronous electrical machine having a field winding, of a pair of exciters for energizing said winding, a transfer switch for selectively connecting said exciters with said winding, a by-pass for said field winding, a field switch for selectively connecting said field winding with said transfer switch and by-pass, a solenoid for controlling said field switch, a switch for controlling the circuit of said solenoid, and means for interlocking said transfer switch with said solenoid circuit switch to automatically effect operation of said field switch to disconnect said transfer switch from said field winding and to connect said by-pass with said field winding during the operation of said transfer switch.

5. The combination with a synchronous electrical machine having a field winding, of a pair of generators for energizing said winding, a common circuit for said generators, a transfer switch for selectively connecting said generators with said common circuit, a by-pass resistance, a magnetic switch for selectively connecting the field of said synchronous machine and said by-pass resistance with said common generator circuit, and a switch having interlocking connection with said transfer switch for effecting operation of said magnetic switch when said transfer switch is operated and prior to the opening of the circuit by said transfer switch.

6. The combination with a synchronous electrical machine having a field winding, of a pair of exciters for energizing said winding, a common circuit for said exciters, a transfer switch for selectively connecting said exciters with said common circuit, said transfer switch operating to disconnect one of said exciters from said common circuit prior to the connection of the other exciter with said circuit, a by-pass resistance, a field switch for selectively connecting the field winding of said synchronous machine and said by-pass resistance with said common circuit, electrical means for operating said field switch, and a control switch interlocked with said transfer switch for controlling said electrical means to effect operation of said field switch when said transfer switch is operated and prior to the opening of the circuit controlled by said transfer switch.

7. In combination, a synchronous machine having a field winding, of a pair of exciters for energizing said winding, a transfer switch, a circuit connecting said switch to said field winding, a field switch in said circuit, two pairs of exciter contacts for separately connecting said exciters to said circuit, two pairs of switch contacts on said transfer switch, each pair of which is arranged upon movement of said switch to engage a co-operating pair of said exciter contacts while the other pair of said switch contacts is disengaged from the other pair of said exciter contacts, a solenoid for holding said field switch closed, a shunt circuit, means acting when said solenoid is de-energized to open said switch and substantially simultaneously connect said shunt circuit with either solenoid or magnet winding, a solenoid circuit having separate circuit making contacts operated thereby, a third pair of contacts on said transfer switch each of which engages one of said separate contacts when said transfer switch is moved to engage one pair of said exciter contacts with their co-operating switch contacts, each contact of said third mentioned pair being disengaged upon movement of said switch from its cooperating contact before the disengagement of the corresponding pair of exciter contacts from their co-operating switch contacts.

In testimony whereof I have signed my name to this specification on this 13th day of August, A. D. 1925.

JAY R. WATSON.